Dec. 3, 1963    A. W. BAIRD    3,112,663
ROUND STOCK DRESSING TOOL
Filed Dec. 6, 1961    2 Sheets-Sheet 1
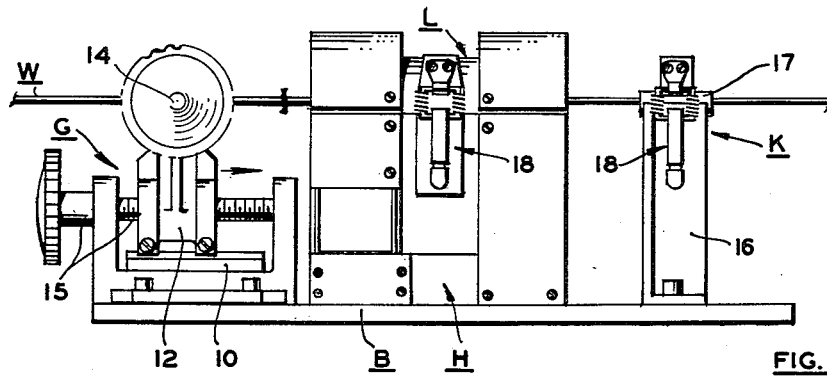
FIG. 1
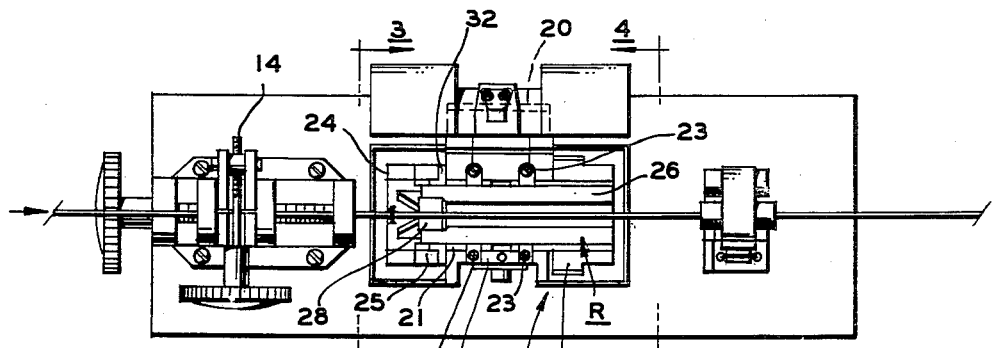
FIG. 2
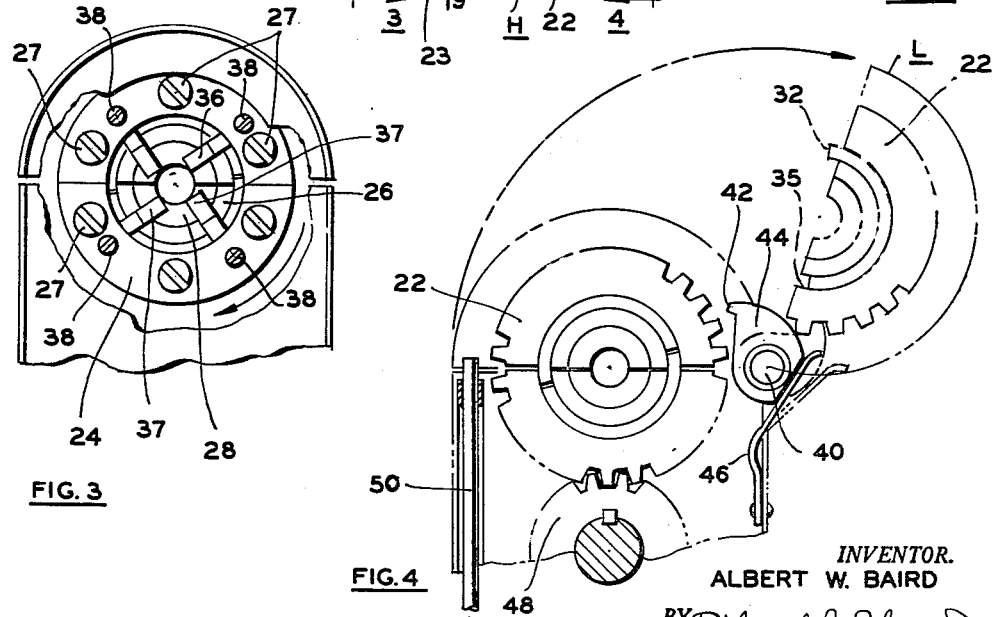
FIG. 3
FIG. 4
*INVENTOR.*
ALBERT W. BAIRD
BY Richard S. Shreve
ATTORNEY

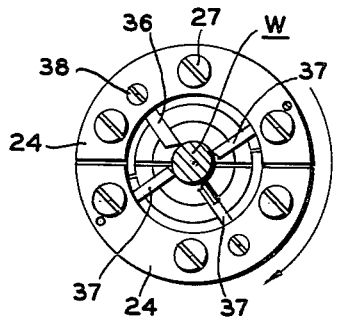
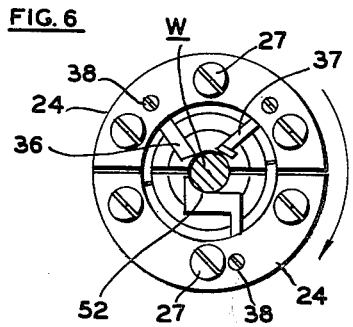
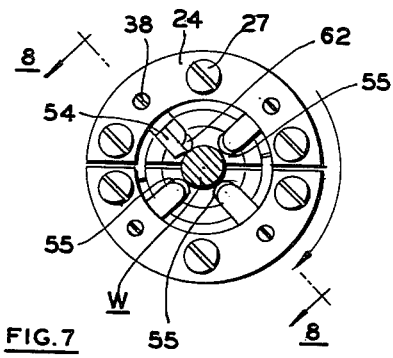
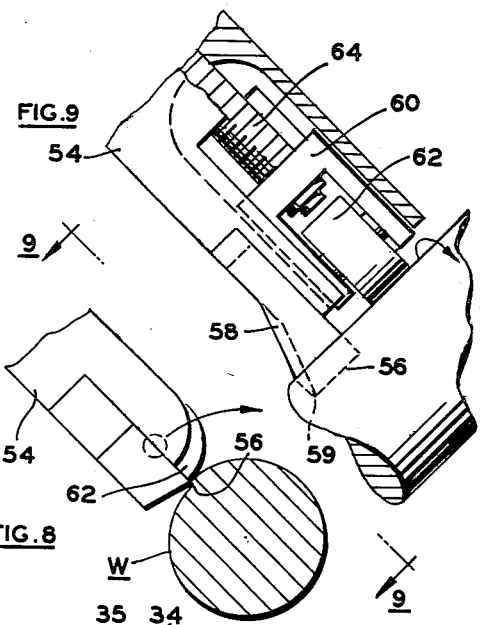
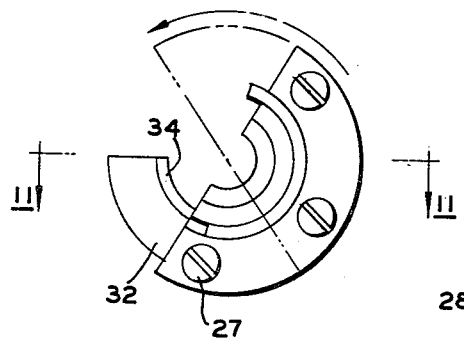
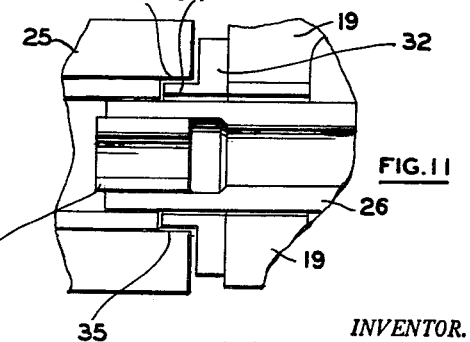
INVENTOR.
ALBERT W. BAIRD United States Patent Office 3,112,663
Patented Dec. 3, 1963

3,112,663
ROUND STOCK DRESSING TOOL
Albert W. Baird, 15 Dunham Ave., Cranford, N.J.
Filed Dec. 6, 1961, Ser. No. 157,455
3 Claims. (Cl. 82—20)

This application relates to round stock dressing tools, and constitutes in part a continuation of my copending parent application Serial No. 765,620 filed October 6, 1958, now abandoned, the entire disclosure of which by this reference is hereby incorporated into this application.

The tool according to said parent application is a hand type, in which the tool is held in the hand and brought to the workpiece. The main object of the present invention is to provide a bench or table type, in which the tool base is relatively stationary, and the work is fed into the tool.

Other objects are to interlock the parts of the split bearing and divided rotor, whereby opening the split bearing carries the parts of the divided rotor therewith ready to receive the workpiece, and to prevent relative rotation of the interlocking means after the bearing is opened.

Further objects are to provide a mechanical feed and a delivery bearing for the workpiece, to provide improved dresser elements for the dresser rotor, and to cut off the power to the rotor drive when the split bearing is opened.

According to the present invention, the tool comprises a split bearing in which is journaled a bottom dressing rotor divided axially into complementary parts. The split bearing and the rotor parts have relatively rotatable interlocking means, preferably an annular flange collar on the bearing fitting into an annular groove in the rotor. Relative rotation of the flange and groove is prevented preferably by a hinged tooth engaging a gear portion of the rotor.

The work feeding means preferably comprises a clamp movable along a track on the tool base, ahead of the rotor housing, and a split bearing is mounted on a pedestal on the base beyond the rotor housing.

Each of the separable parts of the rotor preferably comprises a sleeve portion journaled in bearing shells in the rotor housing, a gear portion at one end and a dressing element holder portion at the other, which has sockets to reserve dresser elements comprising cutter bits, back-up elements and back-up or gauge rollers.

In the drawings:
FIG. 1 is a front elevation of a tool according to the preferred embodiment of the present invention;
FIG. 2 is a plan of the same;
FIG. 3 is a section taken along the line 3—3 of FIG. 2;
FIG. 4 is a section taken along the line 4—4 of FIG. 2;
FIG. 5 is a view similar to FIG. 3 of a modification;
FIG. 6 is a similar view of another modification;
FIG. 7 is a similar view of a further modification;
FIG. 8 is a section taken along line 8—8 of FIG. 7;
FIG. 9 is an elevation looking in the direction of the arrows 9—9 of FIG. 8 and partly in section;
FIG. 10 is a view similar to FIG. 3 with a part of the rotor removed to show the interlock with the bearing; and
FIG. 11 is a section taken along line 11—11 of FIG. 10.

As shown in FIG. 1, the bench or table comprises a base B having a housing H mounted thereon, which contains the rotary parts of the tool. The housing has a lid L hinged thereto, which is opened to receive the workpiece W. A. feed mechanism G is mounted on the base B ahead of the housing H, and a holder bearing K is mounted on the base B beyond the housing H.

The feed mechanism G comprises a longitudinal track 10 on the base B, and a clamp 12 slidable along the track. The clamp is operated by a screw 14 to grip the workpiece, and is moved along the track 10 by a screw 15 to feed the workpiece toward the housing.

The holder bearing K comprises a pedestal 16 mounted on the base B and supporting a split bearing 17 thereon. The split bearing and the housing lid L are held closed by suitable fasteners 18.

In FIG. 2 the housing H is shown with the lid L open, to show a split bearing which has a stationary portion 19 secured in the housing, and a separate portion 20 secured inside the lid L, to open therewith. For convenience in replacement, the bearing is formed of tandem shells 21, removably secured in place by screws 23.

Journaled in the split bearing is a hollow dressing rotor which is divided longitudinally into complementary parts, each comprising a gear portion 22 and a coaxial dressing element holder portion 24. Preferably, each complementary part of the hollow rotor also comprises a sleeve portion 26 journaled in the bearing shells 21, and a reduced diameter centering guide 28 secured inside the sleeve 26.

As shown in FIG. 2, the gear portion 22 has a hub fitting over the rear end of the sleeve 26 and suitably keyed thereto. The dressing element holder portion 24 is preferably semicircular, and secured by screws 27 to a shoulder 25 on the front end of the sleeve 26 and suitably secured thereto as by welding. The holder portion 24 as shown in FIG. 3 has a pair of radial sockets for material removal elements, such as cutter bits 36 spaced at right angles to each other and adjustably secured in these sockets by screws 38.

The portions of each complementary part of the hollow rotor R are circumferentially coextensive through the same angle, and preferably parted on radial planes. When the angle is 180° the rotor is parted on a diameter, forming two halves, with the gear portion 22, holder portion 24, sleeve portion 26 and centering guide portion 28 semicircular in cross section. These complementary parts of the hollow rotor R are separable as units to receive the elongated cylindrical workpiece W, such as a wire, rod or tube which has been butt welded, forming a flange or fin F of excess material.

As shown in FIG. 11, a collar 32 is secured to the housing adjacent the bearing shell and has an annular flange 34 fitting into an annular groove 35 formed in the shoulder 25. The groove 35 permits rotation of the shoulder 25 with respect to the stationary bearing, and forms an interlock to retain the lower half of the rotor with the lower stationary bearing, and to cause the separable bearing to carry the upper part of the separable rotor therewith when the separable part of the bearing is lifted. The other end of the rotor has the same construction with the groove 35 formed in the gear portion 22.

As shown in FIG. 4, the lid L is hinged on a pivot 40, and swings up about the pivot carrying the collar 32 with the annular flange 34 fitting into the groove 35, thus carrying the upper part of the rotor therewith. To prevent relative rotation after the lid is opened, a tooth 42 on a latch 44 pivoted on the pivot 40 engages between teeth on the upper gear portion 22. Further movement of the latch 44 cams against a spring 46 which yields away from the flat on the latch for the remainder of the opening movement.

The gear portions 22 are driven by a pinion 48 from a drive motor not shown, the power circuit of which contains a cut off switch actuated by a plunger 50 slidably mounted in the housing and spring pressed upwardly to project above the parting line when the lid is open, and opening the cut off switch. Closing the lid depresses the plunger and closes the switch.

As shown in FIG. 3, the sockets on the upper part of the holder 24 have two cutter bits 36 therein, and the sockets of the other part have back-up elements 37 therein. As shown in FIG. 5, one of the sockets of the element holder 24 receives a cutter bit 36, and the other three sockets receive back-up elements 37.

In the form shown in FIG. 6, for working on out of round stock, or on hard metals such as steel and copper, one of the other sockets receives a back-up element having a concave socket 52 to hold down or retain the workpiece. With this construction, the centering guide 28 may be omitted.

In the form shown in FIG. 7, for working on soft metals such as aluminum, one of the sockets carries a cutter element 54, and the other three sockets carry back-up elements having rollers 55 journaled therein. As shown in FIGS. 8 and 9, the element 54 carries a bit having one cutting edge substantially parallel to the axis of rotation, and another cutting edge 58 at an acute angle thereto, forming a point 59 to engage the weld upset F near the periphery of the wire. The element 54 carries a clevis 60 adjustable longitudinally of its socket, and a bearing roller 62 journaled in the clevis, which is adjustable by a screw 64 to gauge the depth of cut.

What is claimed is:

1. In a dressing tool for an elongated workpiece, a housing, a split bearing having one section separable and another section secured in said housing, a hollow dressing rotor journaled in said bearing and having therein a reduced centering guide and both divided axially into complementary parts, said split bearing and said divided rotor having relatively rotatable interlocking means comprising a convex annular surface on said separable bearing portion extending longitudinally therefrom and fitting under an overlapping concave annular surface extending longitudinally in the opposite direction inside said interlocking rotor part, whereby removal of said separable bearing section carries the interlocking rotor part therewith, leaving the other rotor part interlocked with the housing bearing section, to open said bearing and rotor to receive said elongated workpiece between the separated parts thereof.

2. In a dressing tool as claimed in claim 1, in which said bearing and rotor are each of greater length than diameter, and in which said interlocking means comprises an annular flange collar on said bearing concentric therewith and having said under fitting convex surface fitting into an annular groove forming said overlapping concave surface in said rotor, in combination with quick acting means for securing said separable bearing section to said housing section with said complementary parts therein and thereby constituting the sole means for securing said complementary parts together.

3. In a dressing tool for an elongated workpiece, a housing, a split bearing having one section separable and another section secured to said housing, a hollow rotor having a portion journaled in said bearing and the entire rotor divided along the same plane of cleavage as said split bearing into complementary parts, each of said complementary parts comprising a gear portion, a coaxial reduced centering guide portion, and a coaxial element holder portion, said split bearing and said divided rotor having relatively rotatable interlocking means comprising an annular flange collar projecting longitudinally from said separable bearing section and fitting into an annular groove in said interlocking rotor part, said groove forming a concave surface overlapping said flange, and said flange forming a convex surface underlying said concave groove surface, whereby removal of said separable section of said split bearing carries the interlocking divided part of said rotor therewith, with the gear portion thereof carrying the reduced centering guide portion and the holder portion thereof therewith, leaving the other part of said divided rotor interlocked with the section of said split bearing secured to said housing, to open said split bearing and divided rotor to receive said elongated workpiece between the separated parts thereof.

References Cited in the file of this patent
UNITED STATES PATENTS

| | | |
|---|---|---|
| 343,955 | Harris | June 15, 1886 |
| 584,213 | Fitz | June 8, 1897 |
| 625,922 | Brightman | May 30, 1899 |
| 899,536 | Jacobs | Sept. 29, 1908 |
| 1,417,621 | Marsh | May 30, 1922 |
| 2,162,187 | Tharp | June 13, 1939 |
| 2,270,548 | Olson | Jan. 20, 1942 |
| 2,427,322 | Darner | Sept. 9, 1947 |
| 2,655,066 | Siegerist | Oct. 13, 1953 |